United States Patent [19]
Dubois

[11] Patent Number: 5,926,995
[45] Date of Patent: Jul. 27, 1999

[54] AUDIBLE FISHING LURE HAVING A SOUND EMITTING CHAMBER

[75] Inventor: Eugene Dubois, Baker, La.

[73] Assignee: Bass Pro Trademarks, L.P., Springfield, Mich.

[21] Appl. No.: 08/862,121

[22] Filed: May 22, 1997

[51] Int. Cl.⁶ .................................................. A07K 85/00
[52] U.S. Cl. ......................................................... 43/42.31
[58] Field of Search .............................. 43/42.31, 42.35, 43/42.39, 42.36

[56] References Cited

U.S. PATENT DOCUMENTS

| | | | |
|---|---|---|---|
| 841,429 | 1/1907 | Passage | 43/42.31 |
| 2,573,399 | 10/1951 | Cannon | 43/42.31 |
| 2,575,139 | 11/1951 | Smith | 43/42.31 |
| 2,878,612 | 3/1959 | Netherton et al. | 43/42.31 |
| 3,894,350 | 7/1975 | Parker . | |
| 4,432,156 | 2/1984 | Gowing | 43/42.31 |
| 4,761,910 | 8/1988 | Ninomiya | 43/42.31 |
| 4,930,247 | 6/1990 | DuBois . | |

*Primary Examiner*—Thomas Price
*Attorney, Agent, or Firm*—Shook, Hardy & Bacon LLP

[57] ABSTRACT

A top water fishing lure with a tubular sound emitting chamber for the attraction of fish is disclosed. The lure preferably contains a tubular sound emitting chamber running nearly the length of the lure. A striker element is movably contained therein to strike either end of the chamber as the lure is moved from an angled position to a near horizontal position during use.

24 Claims, 1 Drawing Sheet

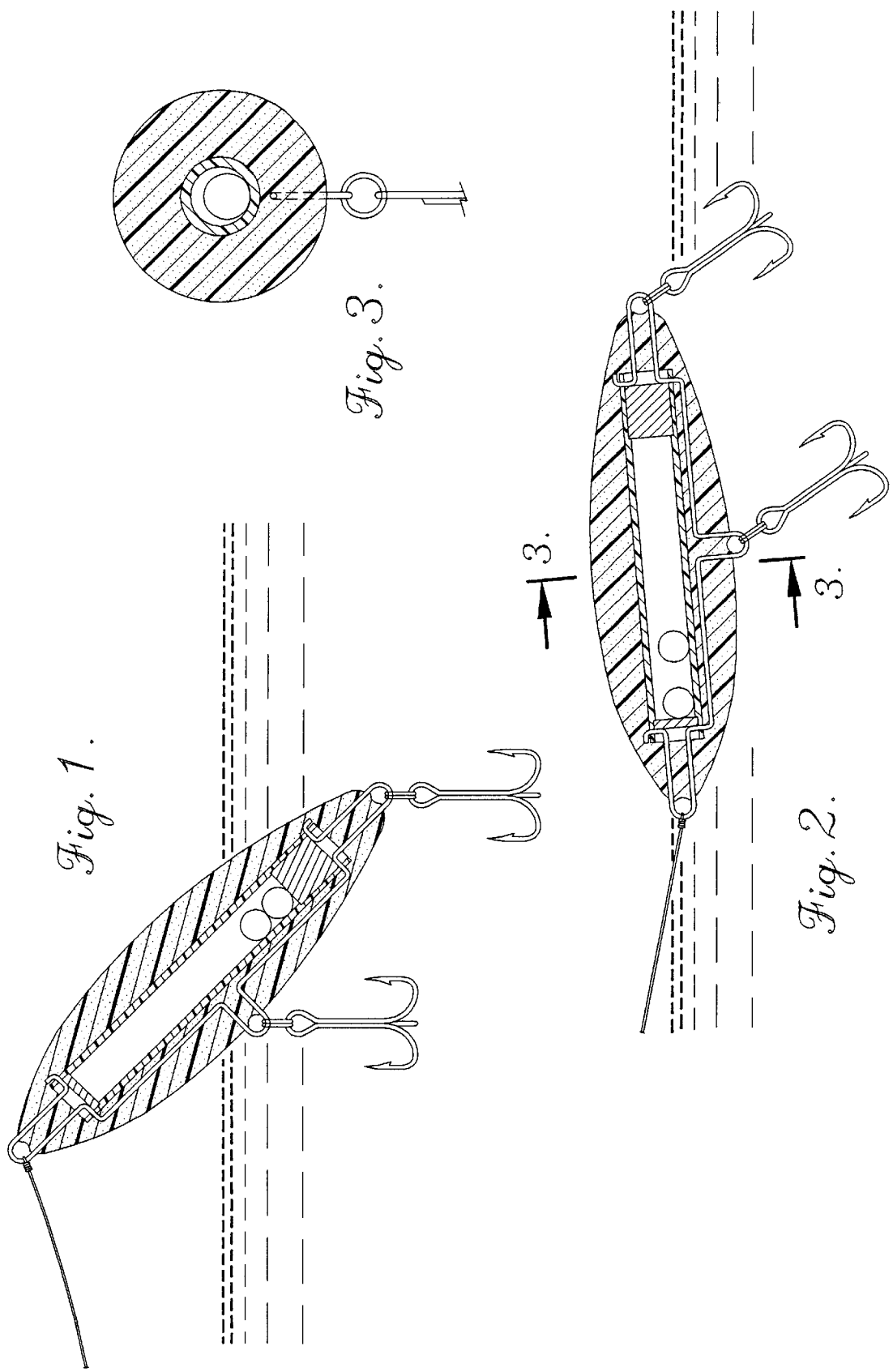

AUDIBLE FISHING LURE HAVING A SOUND EMITTING CHAMBER

FIELD OF THE INVENTION

The present invention relates to an audible fishing lure. More particularly, the invention relates to a top water, plug style lure, having a built-in, tubular chamber which is adapted to receive an impact providing striker element for the production of sound.

BACKGROUND OF THE INVENTION

Fishing and fishing lures have been around for hundreds of years. In an attempt to make it easier to catch fish, mankind has tried several ways to attract fish to lures. Two of the most common ways have been to make lures colorful and realistic looking. Other popular ways to attract fish to lures consist of covering the lure with some type of odor producing material, making the lure in a shape that when pulled through the water makes the lure move back and forth rapidly, or adding spinners or other devices to catch the eye of nearby fish. One method that has been found particularly useful in attracting fish is providing sound through some manner. Sound producing lures are well known in the art.

One way to produce sound, in conjunction with a lure, is to add metal attachments onto a lure in a manner such that when drawn through the water, the attachments will be forced to strike each other, thus creating a desired sound. This has been accomplished through the use of different types of spinners and rattle attachments.

Another method for producing sound is to enclose a metal ball in a cavity or chamber within the lure. As the lure is moved through the water, the action of the lure causes the ball to move around and strike the sides of the chamber thereby producing an audible noise (see e.g., Parker, U.S. Pat. No. 3,894,350). Different sounds may be produced by varying the number of balls within the chamber, and by varying the size of the chamber.

The prior art teaches the use of a ball or several balls within a chamber such that the balls are allowed to move in a random fashion, thereby striking each other and the exterior walls of the chamber to create the desired noise. While some benefit may be derived from using such an arrangement, such a lure provides certain drawbacks. Such drawbacks include uncontrolability of sound production, lack of ability of the lure to make realistic, life-like movements in the water, and a lack of ability to generate significant enough impacts to create a desired high volume impact sound. Therefore, there is a need for a fishing lure having an internally contained, sound producing chamber capable of producing loud impact sounds and capable of controlling the orientation of the lure in the water. The present invention overcomes the drawbacks of the prior art, and fills these and other needs.

SUMMARY OF THE INVENTION

It is a general object of the present invention to provide an audible, top water style fishing lure which is highly attractive to fish.

It is an object of the present invention to provide a lure which is constructed to create a significant noise that is effective in attracting fish.

Another object of the present invention is to provide an impact noise producing fishing lure capable of altering its position during use in a manner to create life-like movements.

In order to overcome the above-stated problems and limitations, and to achieve the noted objects, there is provided a noise producing fishing lure which has a tubular sound emitting chamber contained therein and is adapted to receive an impact providing striker element.

In general, the lure comprises a body, a tubular sound emitting chamber, one or more striker elements, and a balance weight. The lure also preferably includes a wire harness partially contained therein. In the preferred form, the sound emitting chamber is cylindrical and runs nearly the length of the lure, the striker element is formed by two metal balls, and the wire harness provides a front line tie and two hook hangers for the attachment of hooks thereto. The balance weight is located at a rear end of the sound emitting chamber.

In use, a user casts the lure into the water. In a first or rest position, the lure floats at a 45°–80° angle with respect to the surface of the water due to the presence and location of the balancing weight. In this rest position, the balls are at the rear end of the sound emitting chamber and abutting the balance weight. As the user retrieves the lure, tension is placed on the fishing line attached thereto, causing the front end of the lure to move downward towards the surface of the water.

As the front end of the lure moves downward and the body approaches a horizontal position, the balls begin to roll from the rear end of the sound emitting chamber to the front end. As the balls move to the front of the sound emitting chamber, the mass of the balls cause the center of gravity of the lure to move toward the front end of the lure. When the balls reach the front end of the tubular sound emitting chamber, they create an impact therewith which produces a desired clicking sound that has been determined to be attractive to fish. When the balls are at the front end of the sound emitting chamber, the lure body moves past a horizontal position and into a second or tension position were its front end is lower than its rear end.

When the user releases the tension on the fishing line, the balance weight in the rear end of the lure causes the lure to return to the rest position and thereby causes the balls to roll back to the rear end of the tubular sound emitting chamber. Again, the balls strike an end of the tubular sound emitting chamber, thereby producing another clicking noise. Through a series of short jerking motions during the retrieval of the lure, a user is able to control the production of sound and attract fish. The different positions the lure assumes as it is retrieved create a motion that also helps in attracting fish.

Benefits of the lure over the prior art include the ability to control the production of the impact noises, the ability to control the orientation of the lure with respect to the surface of the water to promote movements that attract fish, and the ability of the lure to generate impact noises of greater magnitude.

Further objects, features and advantages of the present invention over the prior art will become apparent from the detailed description of the drawings, which follow, when considered with the attached figures.

DESCRIPTION OF THE DRAWINGS

The objects and features of the invention noted above are explained in more detail with reference to the drawings, in which like reference numerals denote like elements, and in which:

FIG. 1 is a longitudinal, cross-sectional view of the lure of the present invention in the rest position;

FIG. 2 is a longitudinal cross-sectional view of the lure of the present invention in the tension position; and FIG. 3 is a cross-sectional view of the lure of the present invention along the line 3—3 of FIG. 2.

DETAILED DESCRIPTION OF THE PREFERRED EMBODIMENT

FIG. 1 illustrates the lure 10 of the present invention in the first or rest position. In a preferred form, and as illustrated in FIG. 1, the lure 10 comprises a body 20, a sound chamber 30, two balls 40, a wire harness 50, and a balance weight 60. In use, the lure 10 also comprises hooks 100, a line 110, and rings 120 which attach the hooks 100 to the harness 50.

The body 20 has an elongated shape and includes a front end 22, a rear end 24, a top 26, and a bottom 28. The body 20 may be cast in a mold, made from two halves or manufactured from solid stock. The body 20 is preferably comprised of a high density foam, but may also be made of other materials such as plastic or wood. The high density foam is the preferred material because of its ability to enhance the emission of the sound produced.

The body 20 further has a sound chamber 30 contained therein. The sound chamber 30 is tubular in shape and positioned within the lure 10 to extend longitudinally in the body 20 through the majority of its length. The sound chamber 30 preferably has a cylindrical chamber wall 32, a front end 34, and a rear end 36. The front end 34 of the sound chamber 30 has a front striker plate 35 which may take the form of a disk secured to the wall 32. The rear end 36 of the sound chamber 30 has a rear striker surface 37. The front striker plate 35 and the rear striker surface 37 are preferably made of steel or of another type of metal to maximize the level of sound produced during use. The chamber wall 32 of the sound chamber 30 may be made of the same material that comprises the front and rear striker plates 35, 37, but may be made of a different material if so desired. In the preferred embodiment, the tubular sound chamber 30 is cylindrical in shape.

The lure 10 further has at least one striking element which is preferably in the form of a metal ball 40. In the preferred embodiment, as illustrated in FIGS. 1 and 2, two balls 40 may perform the function of the striking element. The balls 40 are positioned within the tubular sound chamber 30 and are both of a diameter slightly less than the diameter of the cylindrical sound chamber wall 32 to enable the balls 40 to move within the chamber 30 during use (see FIG. 3 in particular). The balls 40 are preferably made of steel or some other metal in an effort to enhance their noise producing and weight distributing abilities. It is understood that the striking element (or elements) need not have a ball shape, but could be of any shape capable of moving about within the sound chamber 30. However, a ball shape is used in the preferred embodiment because of its ease of movement within the chamber 30. It should also be understood that the chamber 30 could be of a different shape. The chamber 30 could be rectangular or some other shape, instead of cylindrical, if so desired. However, in the preferred embodiment the sound chamber 30 is cylindrical because a cylindrical shape has been found to provide the best sound emitting qualities.

The wire harness 50 may take the form of a wire 51 bent in a desired arrangement and largely embedded in the body 20 of the lure 10. Preferably, the wire 51 is bent to provide a front line tie 52, located at the front end 22 of the body 20, a bottom hook hanger 54, located at the bottom 28 of the body 20, and a rear hook hanger 56 located at the rear end 24 of the body 20. In use, the front line tie 52 has a fishing line 110 tied to it and the bottom and rear hook hangers 54, 56 each retain a hook 100 through the use of a ring 120. The wire harness 50 is also useful during the formation of the lure 10 by holding parts which form the sound chamber 30 in the proper positions during the formation of the lure body 20 through a molding process. It is to be understood that the lure 10 need not include the wire harness 50 but could instead have other means, known in the art, capable of providing adequate line tie and hook attachments substituted therefor.

The balance weight 60 is located at the rear end 36 of the sound chamber 30 and is secured to the wall 32. The balance weight 60 assists in achieving the desired orientation of the lure 10 in the water 130 in its rest position (FIG. 1). The angle of the longitudinal axis of the lure 10 in the rest position is preferably in the range of 45 to 80 degrees. The balance weight 60, in the preferred form of the invention, has a front side 62 which faces the interior of the sound chamber 30 and provides the rear striker surface 37. The balance weight 60 is preferably constructed of steel or another metal in order to maximize its ability to produce sound and act as a weight. It is to be understood that the balance weight 60 need not be an individual element but may take any form capable of making the rear end 24 of the lure 10 heavier to achieve the desire orientation of the lure 10 in the rest position.

The hooks 100 can be of any suitable type. In the preferred embodiment, the lure 10 has two hooks 100. The hooks 100 may attached to the lure 10 at the bottom and rear hook hangers 54, 56 formed by the wire harness 50. The hooks 100 are preferably attached to the hook hangers 54, 56 by the wire rings 120.

As illustrated in FIG. 1, the lure 10 normally floats in the water 130 with its longitudinal axis inclined with respect to the surface of the water 135. The rear end 24 of the body 20 of the lure 10 is below the surface of the water 135 and the front end 22 of the body 20 of the lure 10 is above the surface of the water 135. The preferred angle of orientation of the lure 10 with respect to the surface of the water 135 in the rest position is 45°–80°.

FIG. 1 illustrates the lure 10 at a 45° angle in the rest position. The rest position is naturally assumed by the lure due to the presence of the balance weight 60 which is positioned at the rear end 36 of the sound chamber 30 and makes the lure 10 heavier at the rear end 24 than at the front end 22. When the lure 10 is in the rest position, the balls 40 are located at the rear end 36 of the sound chamber 30 and rest against the rear striker surface 37.

FIG. 2 illustrates the lure 10 of the present invention in the second or tension position. The second position is achieved when the user, in retrieving the lure 10, places tension on the line 110. When tension is placed on the line 110, the front end 22 of the body 20 of the lure 10 is brought down from an upwardly pointing position to a forwardly pointing position, thus causing the lure 10 to float nearly horizontal but with the front end 22 slightly higher than the rear end 24.

The movement of the lure 10 to a nearly horizontal position allows the balls 40 to move under the influence of momentum and gravity from the rear end 36 of the sound chamber 30 to the front end 34 of the sound chamber 30. As the balls 40 move toward the front end 34 of the sound chamber 30, they gain momentum. The balls 40 continue to move toward the front end 34 of the sound chamber 30 until striking the front striker plate 35, thereby producing a clicking or impact sound. Also, as the balls 40 move toward the front end 34 of the sound chamber 30, the mass of the balls 40 continually changes the center of gravity of the lure 10. The more the balls 40 move away from the rear end 36 of the sound chamber 30, the more the center of gravity of the lure 10 shifts toward the front end 22 of the body 20, and the faster the balls 40 will move to the front end 22 until impact therewith.

In use, the user casts the lure 10 out into the water 130. The lure 10 floats in the rest position until the user begins to reel the lure 10 back in via the fishing line 110 attached to the front line tie 52. When the user draws the line 110 tight and puts tension on the line 110, the lure 10 moves to the tension position. The balls 40 move toward the front end 22 of the body 20 and help to drop the front end 22 of the body 20 into the water 130 thereby creating a swimming motion by the lure 10. The balls 40 eventually strike the front striker plate 35 and create a clicking sound that attracts fish.

When the user releases the tension on the line 110, the balance weight 60 causes the rear end 24 of the body 20 of the lure 10 to sink underwater as the lure 10 returns to the rest position. As the rear end 24 of the body 20 sinks, it drops below the front end 22, and then the balls 40 roll back to the rear end 36 of the sound chamber 30. The balls 40 strike the rear striker surface 37 and produce another clicking or impact sound. As the balls 40 move to the rear end 36 of the sound chamber 30, they again alter the center of gravity of the lure 10 and manipulate the orientation of the lure 10 with respect to the surface of the water 135.

When a user retrieves the lure 10 by way of the line 110, through a series of intermittent jerking motions, the lure 10 alternates between the rest position and the tension position. This alternating movement between the rest position and the tension position during retrieval causes the lure 10 to have an action which looks characteristic of a live, swimming creature to a fish. This action, coupled with the clicking sound which also attracts the attention of the fish, is highly effective in attracting fish.

In accordance with the present invention, the user has the ability to control the production of the impact noises. Unlike the sound emitting lures of the prior art, the present invention allows the fisherman to control the movement of the balls 40 and thus the emission of noise. The sound chamber 30, which runs longitudinally through the lure 10, is of a diameter only slightly larger than the diameter of the balls 40. The lures of the prior art are characterized by chambers with diameters much greater than the diameter of the balls therein, and these lures tend to produce noises from the random impacts of the balls with the chamber walls and also from the impact of the balls against themselves. The present invention, due to its design, only produces significant noise when the balls 40 impact with the front striker plate 35 and the rear striker surface 37. This allows the user to control the production of the desired noise.

Another benefit of the present invention is that noise is only produced by the lure 10 in two positions. These positions are the first or resting position, where little or no tension is placed on the line 110, and the second or tension position, where there is tension on the line 110 sufficient to retrieve the lure 10. In the tension position, the front end 22 of the body 20 of the lure 10 is slightly below the rear end 24 and below the surface of the water 135. While the movement of the balls 40 from one end of the sound chamber 30 to the other may create some inconsequential noise, the significant noise producing quality of the present invention is the impact of the balls 40 with the front striker plate 35 and the rear striker surface 37.

Another benefit of the present invention is its ability to generate significant or high volume impact noises. Because of the length of the sound chamber 30, the balls 40 are able to reach greater speeds than in previous lures, and therefore have a higher velocity upon impact to create louder impact noises.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An audible fishing lure for use in a body of water, said lure to be cast into the water to be retrieved by a fishing line attached to the lure, said lure comprising:

a body having a front end portion, a rear end portion, a top and a bottom;

a sound chamber, said sound chamber located within said body and having a chamber wall, and a front and rear end, said front end of said sound chamber adjacent said front end portion of said body and said rear end of said sound chamber adjacent said rear end portion of said body;

a striking element, said striking element contained and freely and repeatably movable within said sound chamber toward and away from said ends of said sound chamber during retrieval and constructed to effect noise upon impact with at least one of said ends of said sound chamber; and a balance weight located within said body and effective to orient the body in a first or rest position in the water with said front end portion higher than said rear end portion and said striking element abutting said rear end of said sound chamber, said body periodically assuming a second position after tensioning said line, said second position having said rear end portion higher than said front end portion and said striking element abutting said front end of said sound chamber when said line is periodically tensioned and released during retrieval, said body returning to said rest position after tension is removed from the fishing line during retrieval, said body capable of being repeatably movable between said rest position and said second position during retrieval.

2. The lure of claim 1, further comprising a wire harness comprised of a wire bent into a desired orientation, said orientation comprising a line tie and at least one hook hanger, said wire harness partially enclosed within said body.

3. The lure of claim 2, wherein said wire harness is bent to provide two hook hangers including a bottom and a rear hook hanger; said bottom hook hanger located at said bottom of said body and said rear hook hanger located at said rear end portion of said body.

4. The lure of claim 1, wherein said sound chamber is tubular in shape.

5. The lure of claim 4, wherein said striker element comprises a ball.

6. The lure of claim 5, wherein said tubular sound chamber is cylindrical in shape.

7. The lure of claim 6, wherein said sound chamber has a diameter which is slightly larger than a diameter of said ball.

8. The lure of claim 4, wherein said front and rear end of said sound chamber provide metal surfaces.

9. The lure of claim 8, wherein said balance weight presents the metal surface at the rear end of said sound chamber.

10. The lure of claim 1, wherein said sound chamber is tubular in shape and extends from a location adjacent to said front end portion of said body to a location adjacent to said rear end portion of said body.

11. The lure of claim 1, wherein said balance weight is located at said rear end portion of said body and has a mass large enough to make said body float at an orientation in the rest position wherein a longitudinal axis of the body has an approximate 45°–80° angle with respect to a surface of the water.

12. The lure of claim 1, wherein said body is comprised of a high density foam.

13. The lure of claim 1, wherein both of said ends of said sound chamber are for producing sound when struck and said striking element is constructed to effect noise upon striking both of said ends of said sound chamber.

14. A top water fishing lure for use in a body of water and retrievable via a fishing line, said lure comprising:
a lure body having a front end, a rear end and a longitudinal dimension;
a tubular sound emitting chamber oriented longitudinally within said body and extending from near said front end to near said rear end of said body, said chamber having a front end presenting a first striker plate and a rear end presenting a rear striker surface, said striker plate and said striker surface facilitating the production of sound when struck by a moving ball;
at least one ball enclosed within said tubular sound emitting chamber and operable to effect noise upon striking said striker plate and said striker surface, said ball freely and repeatably movable between said striker plate and said striker surface during the retrieval of the lure; and
a balance weight located within said sound emitting chamber adjacent said rear end of said body at a location to normally effect a first or rest position of the body when in the water wherein said front end of the body is higher than said rear end of the body to urge the ball toward said rear striker surface, said body, after periodically subjected to a tension force on its front end by the fishing line during the retrieval of the lure, assuming a second position wherein said ball has moved toward the front end of the chamber and the front end of the body moves to a position substantially equal that of the back end of the body to effect striking of said ball against said first striker plate, said lure repeatably movable between said rest position and said second position during retrieval of the lure when said line is periodically tensioned and released, said ball repeatedly and alternatingly striking said striker plate and said striker surface.

15. The lure of claim 14, further comprising a wire harness, said wire harness contained partially within said body.

16. The lure of claim 15, further comprising at least one hook attached to a portion of said wire harness not contained within said body.

17. The lure of claim 16, wherein said portion of said wire harness not contained within said body comprises a front line tie located at said front end of said body, a bottom hook hanger located at a bottom portion of said body, and a rear hook hanger located at said rear of said body.

18. The lure of claim 14, wherein said body is comprised of a high density foam.

19. The lure of claim 14, wherein said first striker plate and said rear striker surface comprise metal.

20. The lure of claim 19, wherein said balance weight forms said rear striker surface.

21. A sound emitting fishing lure, comprising:
a lure body comprised of high density foam and having front and rear ends and a length dimension;
a sound emitting chamber having a longitudinal axis and being positioned within said lure body to extend nearly the entirety of the length dimension of said lure body;
a striker element contained within said sound emitting chamber and movable therein; and
a balance weight in a rearward portion of said lure body at a location wherein, in a first or rest position, said lure body is oriented such that said longitudinal axis of said sound emitting chamber is angularly displaced with respect to a surface of water in which the body floats and wherein, in a second position which achieved by periodically applying and releasing tension to a fishing line attached to the front end of the body, said lure body is oriented such that said front end is below said rear end.

22. The lure of claim 21, wherein said angular displacement of said sound emitting chamber with respect to the water surface is between 45–80°.

23. A fishing lure for use in a body of water and retrievable via a fishing line, said lure comprising:
a body having two ends, a first position in the water wherein one of said ends is above the other end, and a second position wherein said other end is above said one end;
means for alternating said body between said first position and said second position during retrieval of the lure.

24. The lure of claim 23, wherein said means for alternating said body position comprises tension placed and released on the fishing line and a striker element contained within said body and repeatably movable between the ends of said body during retrieval.

\* \* \* \* \*